United States Patent
Gorman

(10) Patent No.: US 7,021,633 B2
(45) Date of Patent: Apr. 4, 2006

(54) LOW FRICTION FLUID SEAL DEVICE WITH ADDITIVE TO RUBBER COMPOUND

(75) Inventor: Hal W. Gorman, Midlothian, TX (US)

(73) Assignee: Gorman Company, Inc., Cedar Hill, TX (US)

( * ) Notice: Subject to any disclaimer, the term of this patent is extended or adjusted under 35 U.S.C. 154(b) by 0 days.

(21) Appl. No.: 09/951,015

(22) Filed: Sep. 11, 2001

(65) Prior Publication Data

US 2003/0057656 A1 Mar. 27, 2003

(51) Int. Cl.
F16J 15/32 (2006.01)

(52) U.S. Cl. .................. 277/549; 277/540; 277/567

(58) Field of Classification Search ........... 277/549, 277/566, 567, 540, 536
See application file for complete search history.

(56) References Cited

U.S. PATENT DOCUMENTS

| 3,554,569 A | | 1/1971 | Gorman | |
| 3,788,654 A | * | 1/1974 | Mandley | 277/434 |
| 3,921,991 A | * | 11/1975 | Beck | 251/214 |
| 4,383,694 A | * | 5/1983 | Fontana | 277/650 |
| 4,447,038 A | * | 5/1984 | Floyd | 277/325 |
| 4,476,772 A | * | 10/1984 | Gorman et al. | 92/168 |
| 4,526,385 A | | 7/1985 | Wheeler | |
| 4,807,890 A | * | 2/1989 | Gorman et al. | 277/346 |
| 4,867,460 A | * | 9/1989 | Colo et al. | 277/556 |
| 5,028,056 A | * | 7/1991 | Bemis et al. | 277/437 |
| 5,305,854 A | * | 4/1994 | Wheeler | 184/24 |
| 5,306,021 A | * | 4/1994 | Morvant | 277/530 |
| 5,377,999 A | | 1/1995 | Gorman | |
| 5,509,670 A | | 4/1996 | Wheeler | |
| 5,607,166 A | | 3/1997 | Gorman | |
| 5,656,693 A | * | 8/1997 | Ellul et al. | 525/171 |
| 5,713,581 A | * | 2/1998 | Carlson et al. | 251/1.2 |
| 5,735,528 A | * | 4/1998 | Olsson | 277/300 |
| 5,889,102 A | * | 3/1999 | Haack et al. | 524/494 |
| 5,951,022 A | | 9/1999 | Gorman et al. | |
| 6,286,839 B1 | * | 9/2001 | Mitsui et al. | 277/603 |
| 6,503,872 B1 | * | 1/2003 | Tomaro | 508/377 |
| 2001/0018475 A1 | * | 8/2001 | Tominaga | 524/62 |

OTHER PUBLICATIONS

Merriam Webster Dictionary on-line, www.m-w.com/cgi-bin/dictionary?book=Dictionary$va=gasket, or link from www.onelook.com.*

* cited by examiner

*Primary Examiner*—William L. Miller
(74) *Attorney, Agent, or Firm*—Jenkins, Wilson & Taylor, P.A.

(57) ABSTRACT

A fluid seal device for use in sealing an annular space between an internal surface of a cylinder and a member therein having an outer cylindrical surface and being formed at least in part from rubber. An oleamide additive is included in the rubber compound comprising about 1.0%–5.0% by weight of oleamide. The oleamide additive to the rubber of the fluid seal device results in a reduced coefficient of friction and low speed vibration as well as enhanced abrasion resistance.

23 Claims, 10 Drawing Sheets

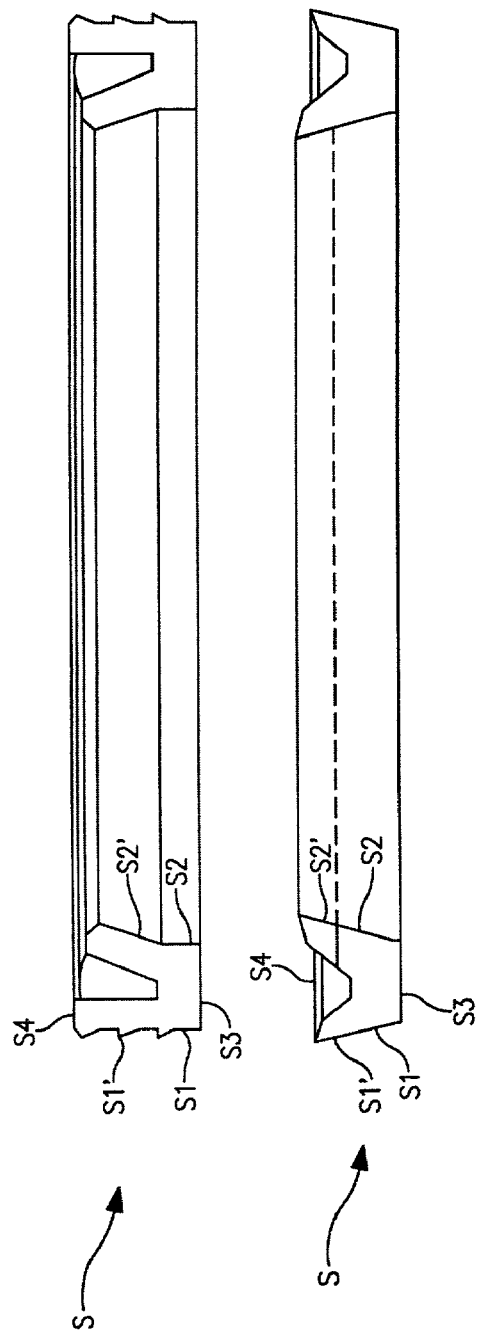
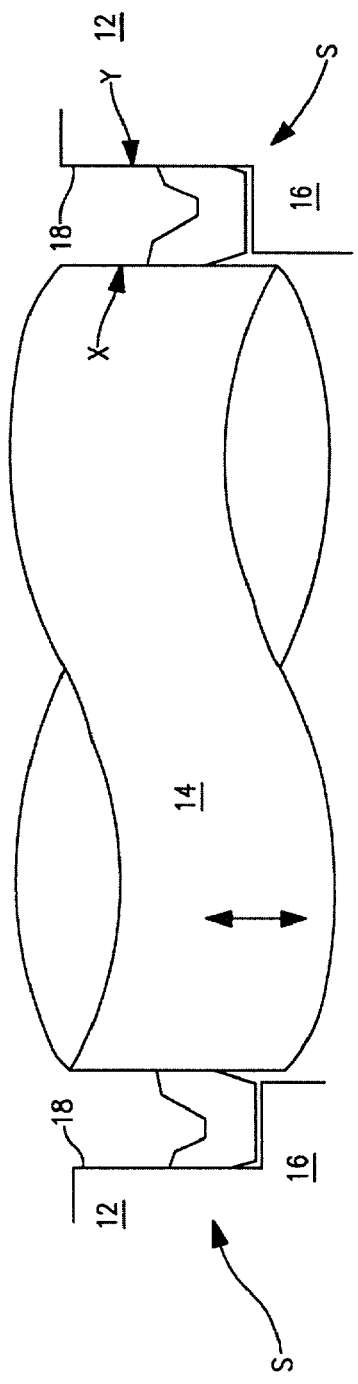
FIG. 1
FIG. 2
FIG. 3

SEALS BREAK AWAY SUMMARY

|   | LOW | HI | Ave. | Description |
|---|---|---|---|---|
| 1 4500 LF1 | 200 | 850 | 525 | 4.5 in. Low Friction |
| 2 4500 LF1 W/A | 109 | 783 | 446 | 4.5 in. Low Friction with additive |
| 3 4500E | 350 | 1400 | 875 | Regular Pressure Seal |
| 4 4500E W/A | 109 | 780 | 446 | Regular Pressure seal with additive |
| 5 105MM NC6088 | 314 | 910 | 612 | 105MM Regular seal |
| 6 105MM NC6088/A | 281 | 730 | 505 | 105MM Regular seal with additive. |
| 7 4.500 PU | 499 | 1311 | 905 | 4.5 in. made from Polyurethane |
| 8 105MM PU | 99 | 820 | 459 | 105MM made from Polyurethane. |

FIG. 4

LOW FRICTION FLUID SEAL DEVICE WITH ADDITIVE TO RUBBER COMPOUND

TECHNICAL FIELD

The present invention relates generally to pressure seal devices. More particularly, it relates to an improved pressure seal or packing member for sealing against differential pressure between an internal surface of a cylinder and an outer cylindrical surface of a member disposed therewithin wherein the rubber compound of the seal is provided with an additive for reduced coefficient of friction and reduced low speed vibration.

RELATED ART

As is well known to those skilled in the fluid seal device art, there are today several general types of fluid seal devices commercially available that are suitable for use with a ram and cylinder (as well as other well-known applications) under pressure loading conditions. Applicant believes that a common problem for all of these conventional fluid seal devices is the tendency to provide too much friction when oil pressure is applied to the fluid seal device during use. In other words, the contact area will tend to increase when hydraulic oil pressure is applied thereto during use and consequently the friction between the ram and cylinder under pressure loading conditions will be correspondingly increased also. This can result in a tendency for the ram within the cylinder to jump or jerk and thereby provide an uneven or jerky motion to an elevator, etc. that is operatively connected to the hydraulic cylinder.

One general type of fluid seal device is the well-known U-type seal ("U seal") which is represented by applicant's own U.S. Pat. No. 3,554,569. This type of pressure seal possesses great efficacy for initial sealing of hydraulic cylinders but may also suffer from a tendency toward increased resistance between the ram and cylinder under hydraulic oil pressure loading conditions. The increased resistance inherent in this type of seal also may result in a tendency for the ram to jerk or jump and impart the jerkiness to associated mechanisms (such as elevators) operatively connected to the hydraulic cylinder. A similar tendency toward increased friction under hydraulic oil pressure loading conditions is also well known to be inherent in other types of hydraulic seals such as V-type seals that are also used in hydraulic elevators and the like. Representative V-type seals are described in applicant's own U.S. Pat. No. 5,951,022.

The prior art fluid seal devices all tend to be compressed under hydraulic pressure within the annular cavity in which the seal resides and against the ram wall by the hydraulic oil pressure applied thereunder during movement of the cylinder ram, and the friction between the seal and the cylinder ram is significantly increased due to the increased surface area of the fluid seal that is brought into contact with the cylinder ram. The tendency of prior art U-type and V-type fluid seal devices to compress and present a greater surface contact area and increased friction with the moving cylinder ram may result in premature seal deterioration and jerkiness in the movement of a mechanism operatively connected to the hydraulic cylinder. This same phenomenon is also known when the prior art fluid seal devices are used in a piston head to seal the moving piston head against the cylinder wall within which the piston moves. U.S. Pat. No. 4,526,385 to Wheeler discloses V-type seals and U-type seals having an annular layer of polymeric material such as polytetrafluoroethylene or polychlorotrifluoroethylene deposited on a woven cloth on the inner wall thereof to reduce friction. However, this seal is not believed by applicant to fully solve the need for a reduced friction fluid seal device as described hereinbefore.

Thus, there is a long-felt need for a fluid seal device that provides a reduced coefficient of friction and a consequently reduced jerkiness in use, particularly during low speed use. Applicant has now invented such an advancement in the art with the low friction seal device of the invention which will be described in specific detail hereinafter.

DISCLOSURE OF THE INVENTION

In accordance with the present invention applicant provides an improvement to fluid seal devices or pressure seals (also known as packing seals or packing members) of the types suitable for uses such as sealing an annular space between an internal surface of a cylinder and a member therein having an outer cylindrical surface as well as for other applications such as within a piston head to seal the piston head against the cylinder wall within which the piston head moves, etc.

The fluid seal device comprises an annular body having an inner side and an outer side, a closed end face and an at least partly open end face, at least one first radial sealing area protruding outwardly from the outer side and at least one second radial sealing area protruding inwardly from the inner side of the annular body. The fluid seal device is formed at least in part from a rubber compound, preferably neoprene rubber, and the neoprene rubber of the fluid seal device comprises about 1.0%–5.0% by weight of oleamide, such as ARMOSLIP® CP as an additive in order to reduce the coefficient of friction and the low speed vibration of the fluid seal device.

Accordingly it is an object of the present invention to provide an improved fluid seal device that possesses a reduced coefficient of friction.

It is another object of the present invention to provide an improved fluid seal device that provides enhanced surface toughness or abrasion resistance.

It is still another object of the present invention to provide an improved fluid seal device that provides reduced low speed jerkiness or vibration.

It is yet another object of the present invention to provide an improved fluid seal device that provides a significant reduction in standing break-away friction and thus a smoother operation of apparatuses such as elevators utilizing the fluid seal devices.

It is yet another object of the present invention to provide an improved fluid seal device that provides reduced running friction and seal-related noises in hot running applications, and a consequent increase in the fluid seal device life span.

Some of the objects of the invention having been already stated, other objects will become evident now as the description proceeds when taken in connection with the accompanying drawings as described hereinbelow.

BRIEF DESCRIPTION OF THE DRAWINGS

FIG. 1 is a side elevation view, partly in section, showing a U-type fluid seal device fabricated in accordance with the present invention;

FIG. 2 is a side elevation view, partly in section, showing a V-type fluid seal device fabricated in accordance with the present invention; and FIG. 3 is a schematic elevational view, partly in section, showing the V-shape fluid seal device of FIG. 2 in a typical installation and being subjected to hydraulic pressure.

FIG. 4 is a chart summarizing breakaway testing of a variety of seal materials with and without the addition of the ARMOSLIP® CP oleamide additive.

BEST MODE FOR CARRYING OUT THE INVENTION

Figure 5:
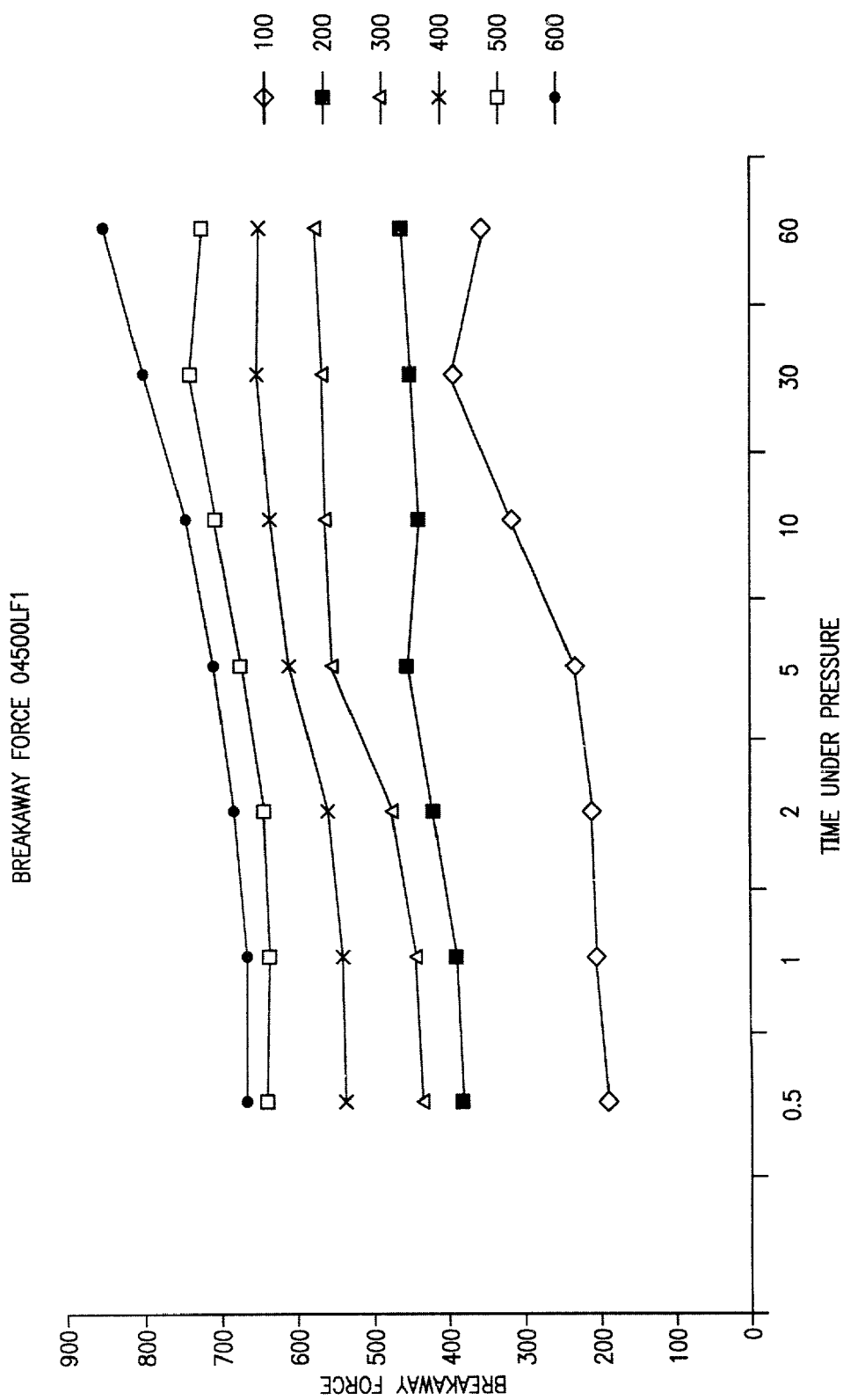
FIG. 5 is a graphical depiction of the breakaway testing on 4.5 inch low friction seals (4500 LF1) without addition of the ARMOSLIP® CP oleamide additive.

For purposes of the foregoing detailed description, the following definitions will be used.

The term "breakaway" is used to describe the force needed to overcome friction between the fluid seal device or seal and a movable member, and more particularly the force to motivate the movable member from the stop position to motion.

The term "jumpiness" or "jerkiness" is meant to describe the sudden jerks or jumps experienced in an apparatus such as an hydraulic elevator when the break-away forces are great.

Referring now to FIGS. 1 and 2 of the drawings, wherein like reference numerals refer to like or similar parts throughout, FIG. 1 depicts a conventional U-type seal S and FIG. 2 depicts a conventional V-type seal S (as also shown in FIG. 3). U-type and V-type seals S each have an annular body with an outer side S1, an inner side S2, a closed end face S3, an at least partly open end face S4, at least one first radial sealing area S1' protruding outwardly from outer side S1, and at least one second radial sealing area S2' protruding inwardly from inner side S2. Although FIGS. 1 and 2 depict conventional U-type and V-type fluid seal devices or seals S which incorporate applicant's novel invention, it should be appreciated that the improvement of the invention can be incorporated into many other types of seals, and thus the invention is not intended to be limited to the U-type and V-type seals depicted in FIGS. 1 and 2, respectively. Although FIGS. 1 and 2 represent typical seals that incorporate the improvement of the invention, the representative seals are not intended to limit the scope of the invention which is defined in the claims appended hereto.

Referring now to FIG. 3 of the drawings, FIG. 3 shows a typical installation such as a hydraulic elevator wherein a fluid seal S (e.g., the V-type seal of FIG. 2) forms a seal between cylinder head 12 and ram or jack plunger 14. In this type of installation, ram or jack plunger 14 normally supports an elevator car and movement of the plunger is controlled by pressure of hydraulic fluid within jack cylinder 16 in a conventional manner. Also, an annular cavity 18 with a square or rectangular cross-section shape is provided in cylinder head 12 for receipt of fluid seal S therein. As best seen with reference to FIG. 3 and as well known in the hydraulic seal art, during up or down movement of ram or jack plunger 14 conventional seal device S acts to provide an increased surface area in contact with moving ram or jack plunger 14 and thereby to significantly increase the friction therebetween. This increased friction between displaced or deformed seal device S and ram or jack plunger 14 during its movement tends to cause jerks or bumps in the movement of jack plunger 14. This problem is well known and is inherent in all known prior art fluid seal devices or seals, including conventional U-type and V-type seals S. Moreover, the high friction phenomenon is found not only in the use of seals S for hydraulic cylinders in elevators, but also for use in farm machinery, construction equipment, automotive applications and many other similar uses.

Friction Reducing Additive

As is well known to those skilled in the hydraulic seal art, U-type seal S shown in FIG. 1 can be manufactured from a solid rubber compound or alternatively can be manufactured with a fabric reinforcement (not shown). V-type seal S shown in FIG. 2 is more typically manufactured with a fabric reinforcement. Although neoprene rubber compound is preferably used to form seals S, other elastomeric compounds can be used including, but not limited to, nitrile rubber, fluro elastomers, urethane, thermoplastic elastomers, and butyl and ethylene propylene. For both types of seals S, the neoprene rubber compound used to form either non-fabric reinforced or fabric reinforced seals S preferably consists of the following compound formulation although other suitable compound formulations are contemplated to be within the scope of the invention:

| INGREDIENT | PHR |
|---|---|
| Polychloroprene (Neoprene) | 100.0 |
| N500 series carbon black | 50.0 |
| Magnesium oxide | 4.0 |
| Zinc oxide | 5.0 |
| Hydrocarbon oil | 2.0 |
| CUMAR ® P25/P10 | 2.0 |
| Octamide | 1.0 |
| Butyl zimate | 1.0 |
| Ethyl zimate | 0.5 |
| Sulfur | 0.5 |
| ARMOSLIP ® CP (Oleamide) | 3.4 (2.0% by weight) |
| TOTAL | 169.4 |

Conventionally, fabric reinforced seals S are made by first building a carcass of uncured rubber-coated fabric. The carcass is formed in a calendaring process wherein a rubber compound, preferably neoprene rubber compound, is spread evenly to both sides of the fabric. The carcass of uncured rubber-coated fabric is then rolled into a coil and the ends joined together to form a ring. The rings of rolled and uncured rubber-coated fabric are then each placed into a mold and subjected to heat and pressure to form either U-type or V-type seal S. This process is entirely conventional and well known to those skilled in the hydraulic seal manufacturing art. Also well known is the use of cotton fabric as the reinforcement fabric in the manufacture of the seals.

Surprisingly, applicant has discovered that providing an additive of between about 1.0%–5.0% by weight, and preferably about 2.0% by weight, of ARMOSLIP® CP oleamide to the neoprene rubber compound will impart enhanced performance characteristics to U-type and V-type seals S. Specifically, the additive to the neoprene rubber compound (or other suitable elastomeric or rubber compound) has been found to add surface toughness (e.g., abrasion resistance) and a reduced coefficient of friction which in turn results in a third benefit of reduced low speed vibration or jerkiness. Although cotton fabric may be utilized in fabric reinforced U-type and V-type seals S, applicant has also discovered that DACRON® polyester and KEVLAR® fabrics, and most preferably DACRON® polyester, also provide excellent results. Further, although the preferred embodiments of the invention are contemplated as including fabric reinforcement to U-type and V-type seals S, a solid neoprene rubber (or other suitable rubber) compound U-type seal S such as shown in FIG. 1 can also be manufactured in accordance with the present invention and provide the enhanced results described herein. Thus, the invention contemplates the use of the ARMOSLIP® CP oleamide additive in both fabric-reinforced and non-fabric reinforced U-type and V-type seals S as a matter of choice.

ARMOSLIP® CP oleamide is available from Lord Corporation of Tokyo, Japan, although applicant believes that any other oleamide brand would work in accordance with the present invention. Oleamide can be described as cis-9-Octadecenamide and possesses the molecular formula $C_{18}H_{35}NO$.

Breakaway Testing Results

FIGS. 4 thorough 12 depict breakaway testing results conducted to gauge the effectiveness of the seal when the ARMOSLIP® CP oleamide additive is added in the seal S material. The breakaway test was constructed to differentiate peak frictional force in pounds to move the plunger through the I.D. of the seal installed in a packing box. The internal hydraulic pressure in the packing box was varied from 100 psi to 600 psi. The time under pressure before the plunger was activated varied from 30 seconds to 60 minutes. A series of seals including 4500LF1, 4500E, and 105 MM N6068 were tested with and without the additive and PU (polyurethane) seals were included for evaluation only.

As shown in the summary chart of FIG. 4, all seals showed lower breakaway force when the ARMOSLIP® CP oleamide additive was added to the seal material.

FIG. 5 represents the breakaway test on 4.5 inch low friction seals (4500 LF1) without addition of the ARMOSLIP® CP oleamide additive. The time under pressure varied from 30 seconds to 60 minutes at a hydraulic pressure from 100 psi to 600 psi. The seal breakaway force during these tests ranged from a minimum of 200 pounds to a maximum of 800 pounds with an average of 525 pounds.

Figure 6:
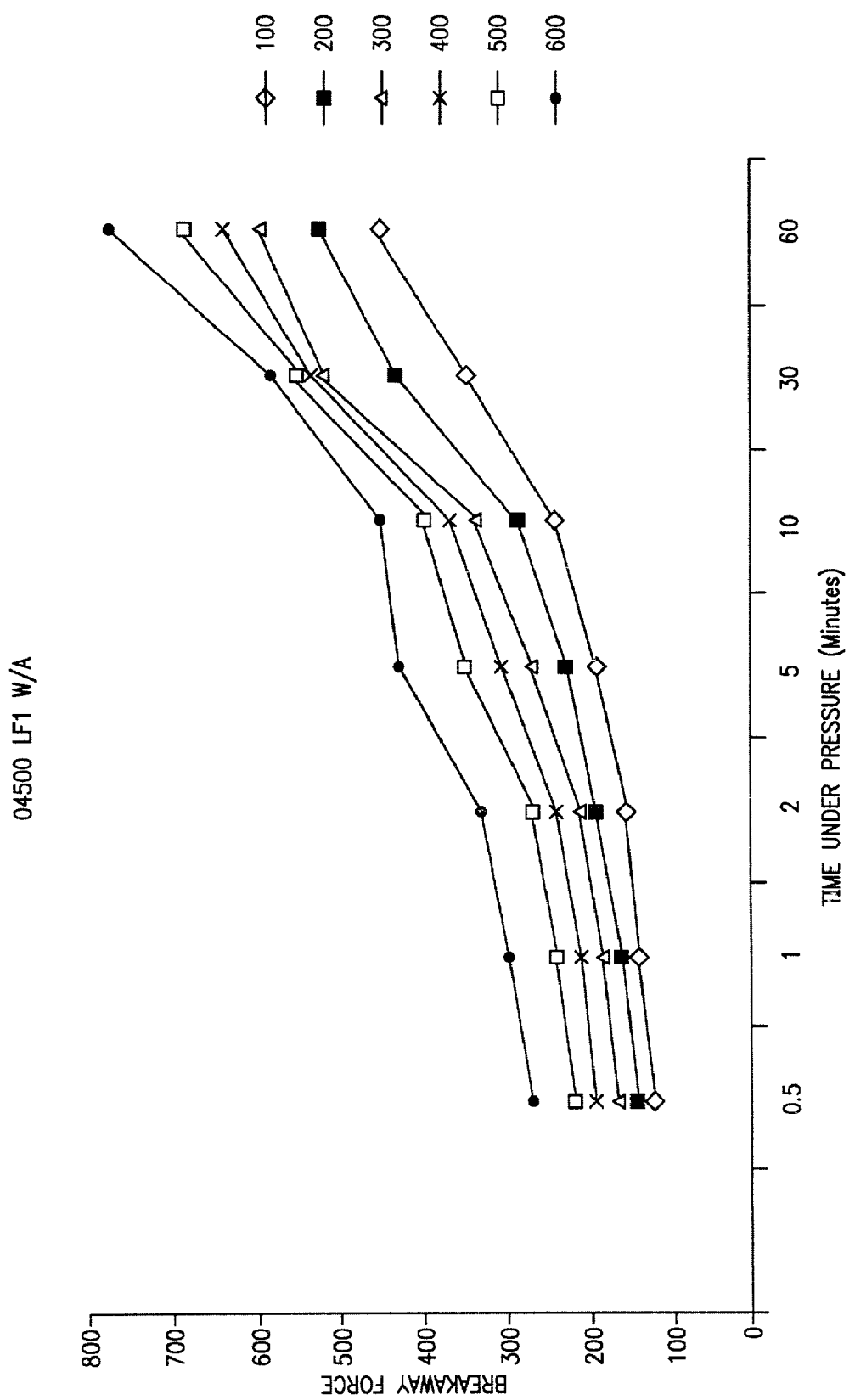
FIG. 6 is a graphical depiction of the breakaway testing on 4.5 inch low friction seals (4500 LF1) with addition of the ARMOSLIP® CP oleamide additive.

FIG. 6 represents the breakaway test on 4.5 inch low friction seals (4500 LF1) with the addition of the ARMOSLIP® CP oleamide additive. The time under pressure varied from 30 seconds to 60 minutes at a hydraulic pressure from 100 psi to 600 psi. The seal breakaway force during these tests ran from a minimum of 109 pounds to a maximum of 783 pounds with an average of 446 pounds.

Figure 7:
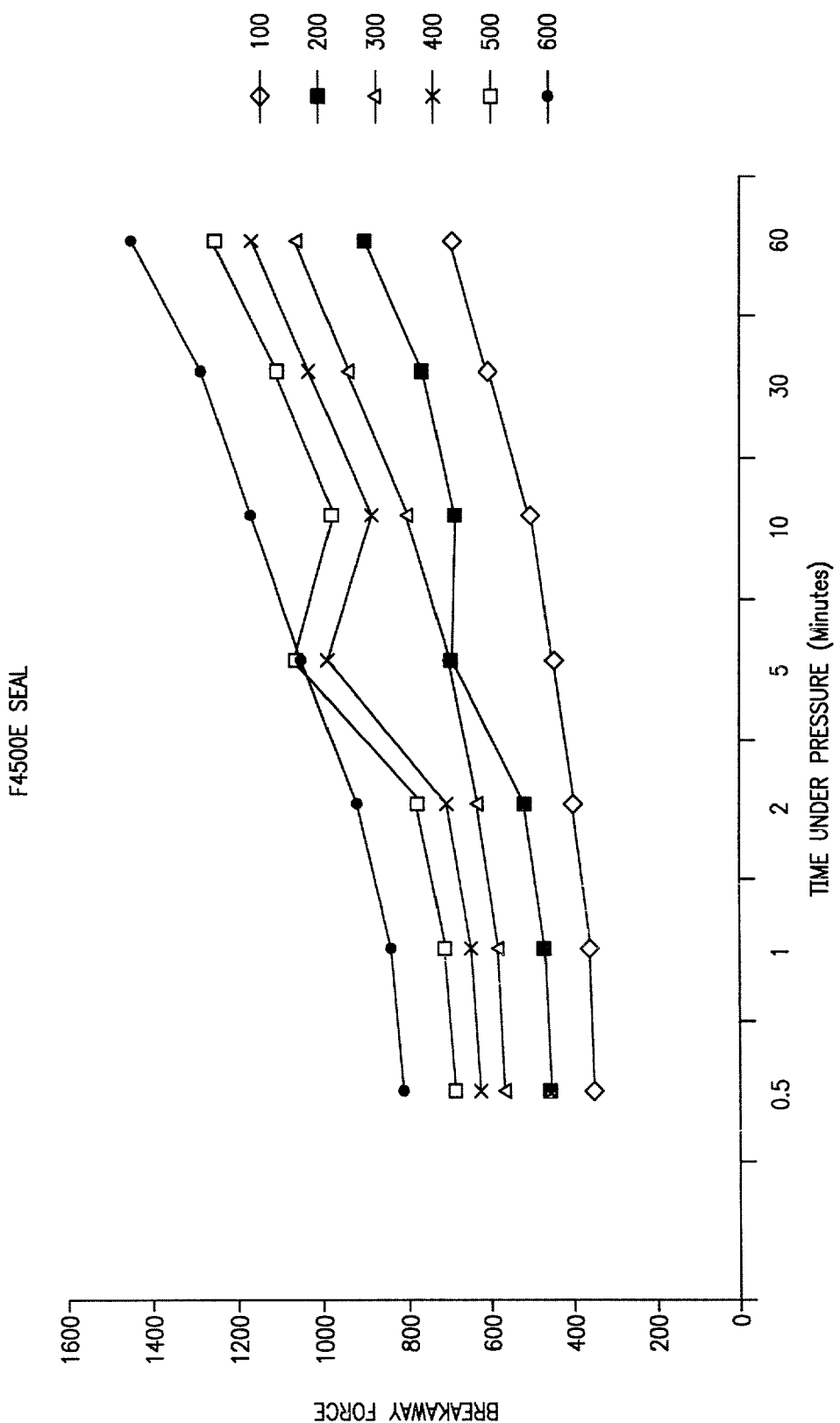
FIG. 7 is a graphical depiction of the breakaway testing on 4.5 inch regular pressure seals (4500 E) without addition of the ARMOSLIP® CP oleamide additive.

FIG. 7 represents the breakaway test on 4.5 inch regular pressure seals (4500 E) without addition of the ARMOSLIP® CP oleamide additive. The time under pressure varied from 30 seconds to 60 minutes at a hydraulic pressure from 100 psi to 600 psi. The seal breakaway force during these tests ran from a minimum of 350 pounds to a maximum of 1400 pounds with an average of 875 pounds.

Figure 8:
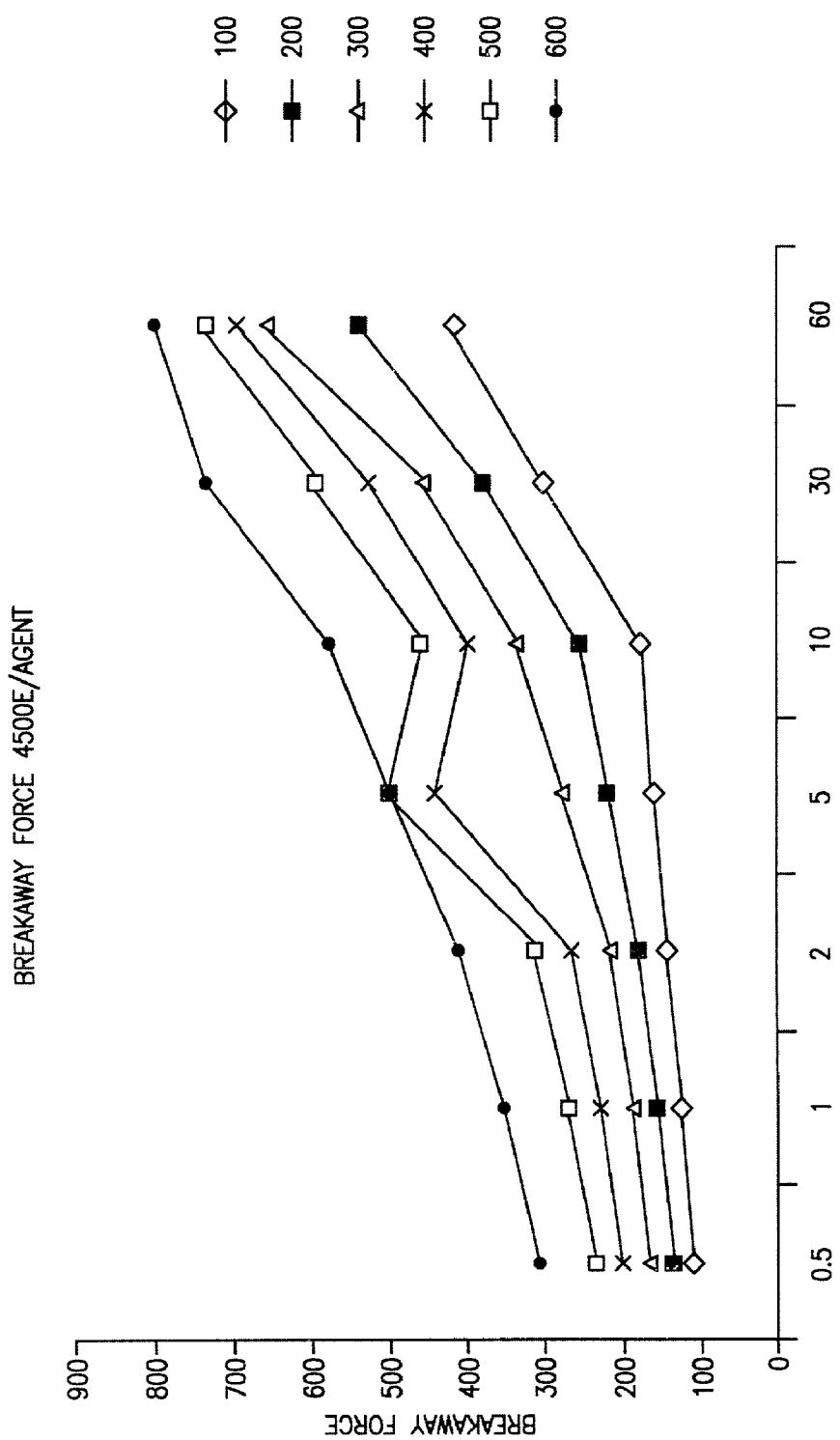
FIG. 8 is a graphical depiction of the breakaway testing on 4.5 inch regular pressure seals (4500 E) with addition of the ARMOSLIP® CP oleamide additive.

FIG. 8 represents the breakaway test on 4.5 inch regular pressure seals (4500 E) with addition of the ARMOSLIP® CP oleamide additive. The time under pressure varied from 30 seconds to 60 minutes at a hydraulic pressure from 100 psi to 600 psi. The seal breakaway force during these tests ran from a minimum of 109 pounds to a maximum of 780 pounds with an average of 446 pounds.

Figure 9:
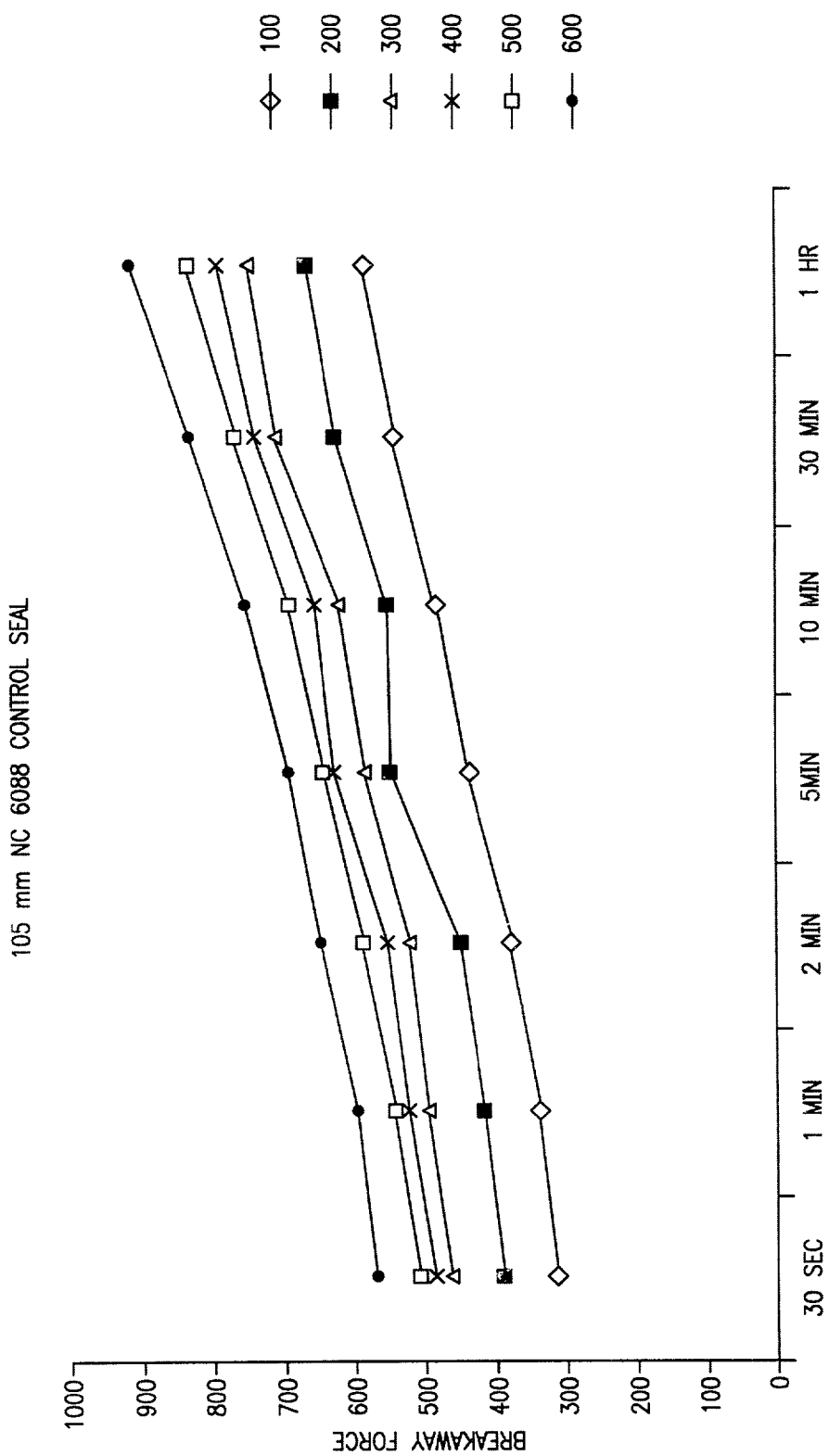
FIG. 9 is a graphical depiction of the breakaway testing on 105 MM regular seals (105 MM NC6088) without addition of the ARMOSLIP® CP oleamide additive.

FIG. 9 represents the breakaway test on 105 MM regular seals (105 MM NC6088) without addition of the ARMOSLIP® CP oleamide additive. The time under pressure varied from 30 seconds to 60 minutes at a hydraulic pressure from 100 psi to 600 psi. The seal breakaway force during these tests ran from a minimum of 314 pounds to a maximum of 910 pounds with an average of 612 pounds.

Figure 10:
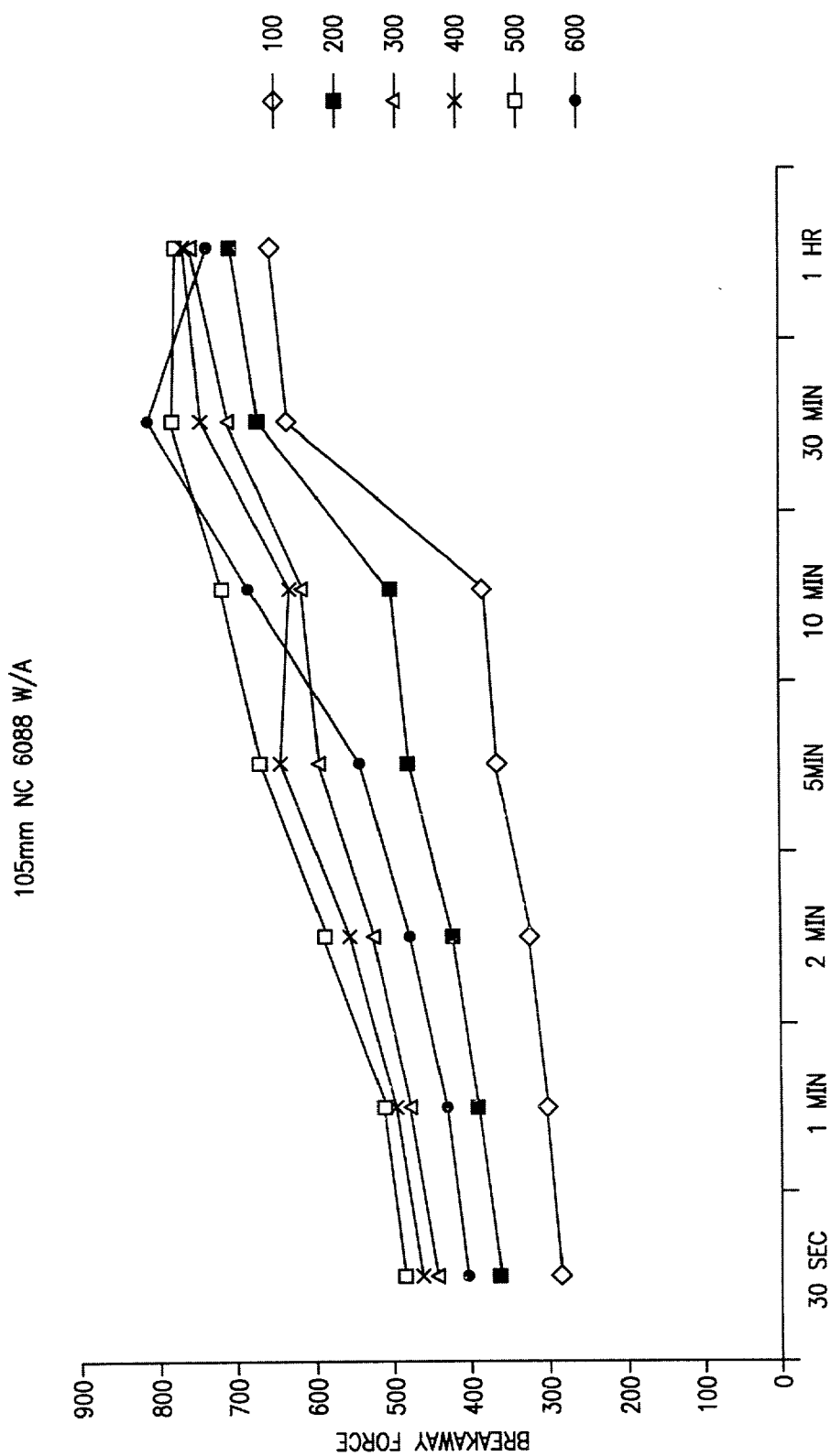
FIG. 10 is a graphical depiction of the breakaway testing on 105 MM regular seals (105 MM NC6088) with addition of the ARMOSLIP® CP oleamide additive.

FIG. 10 represents the breakaway test on 105 MM regular seals (105 MM NC6088) with addition of the ARMOSLIP®CP oleamide additive. The time under pressure varied from 30 seconds to 60 minutes at a hydraulic pressure from 100 psi to 600 psi. The seal breakaway force during these tests ran from a minimum of 281 pounds to a maximum of 730 pounds with an average of 505 pounds.

Figure 11:
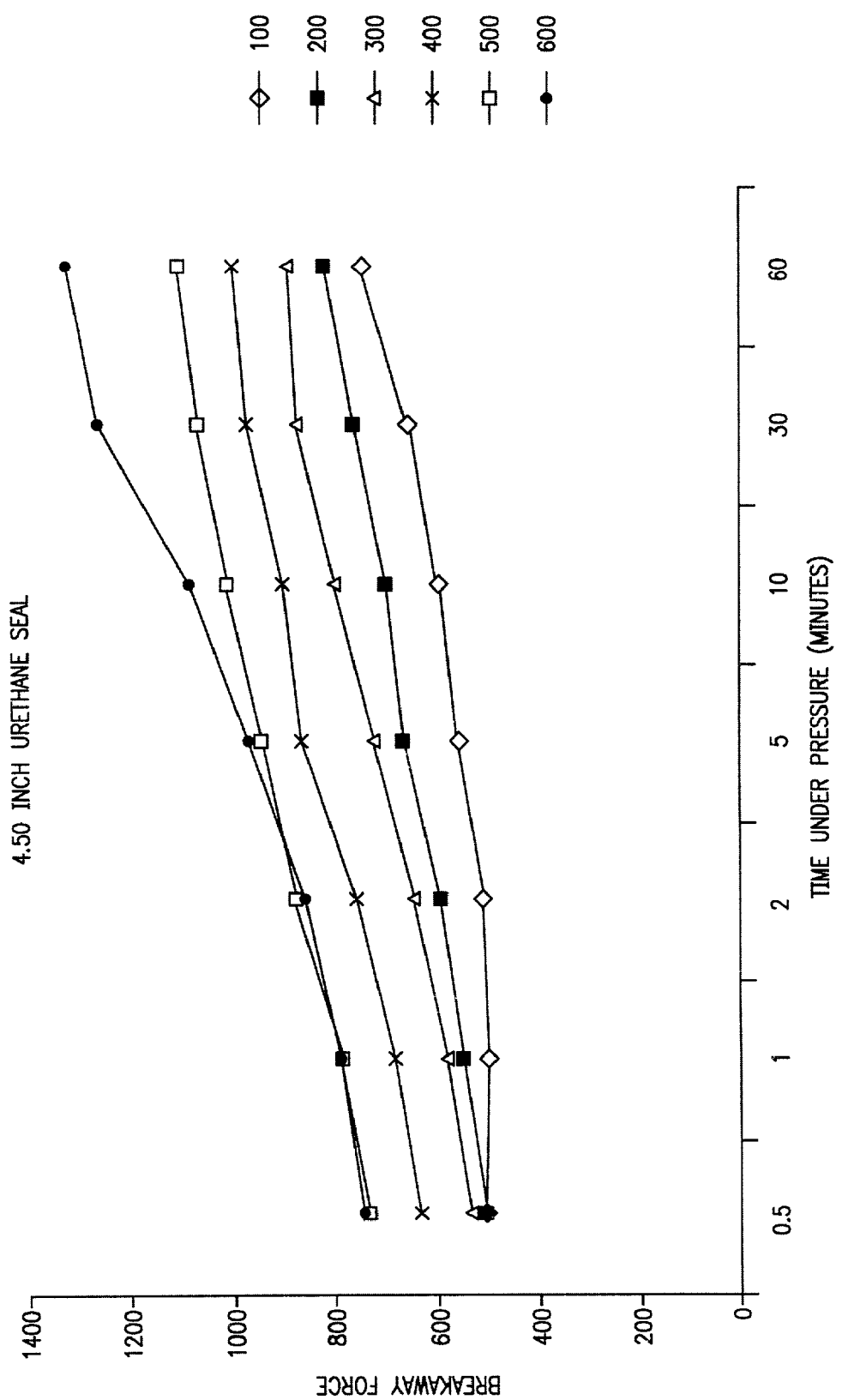
FIG. 11 is a graphical depiction of the breakaway testing on 4.5 inch seals made from Polyurethane (4500 PU) without addition of the ARMOSLIP® CP oleamide additive.

FIG. 11 represents the breakaway test on 4.5 inch seals made from Polyurethane (4500 PU) without addition of the ARMOSLIP® CP oleamide additive. The time under pressure varied from 30 seconds to 60 minutes at a hydraulic pressure from 100 psi to 600 psi. The seal breakaway force during these tests ran from a minimum of 499 pounds to a maximum of 1311 pounds with an average of 905 pounds.

Figure 12:
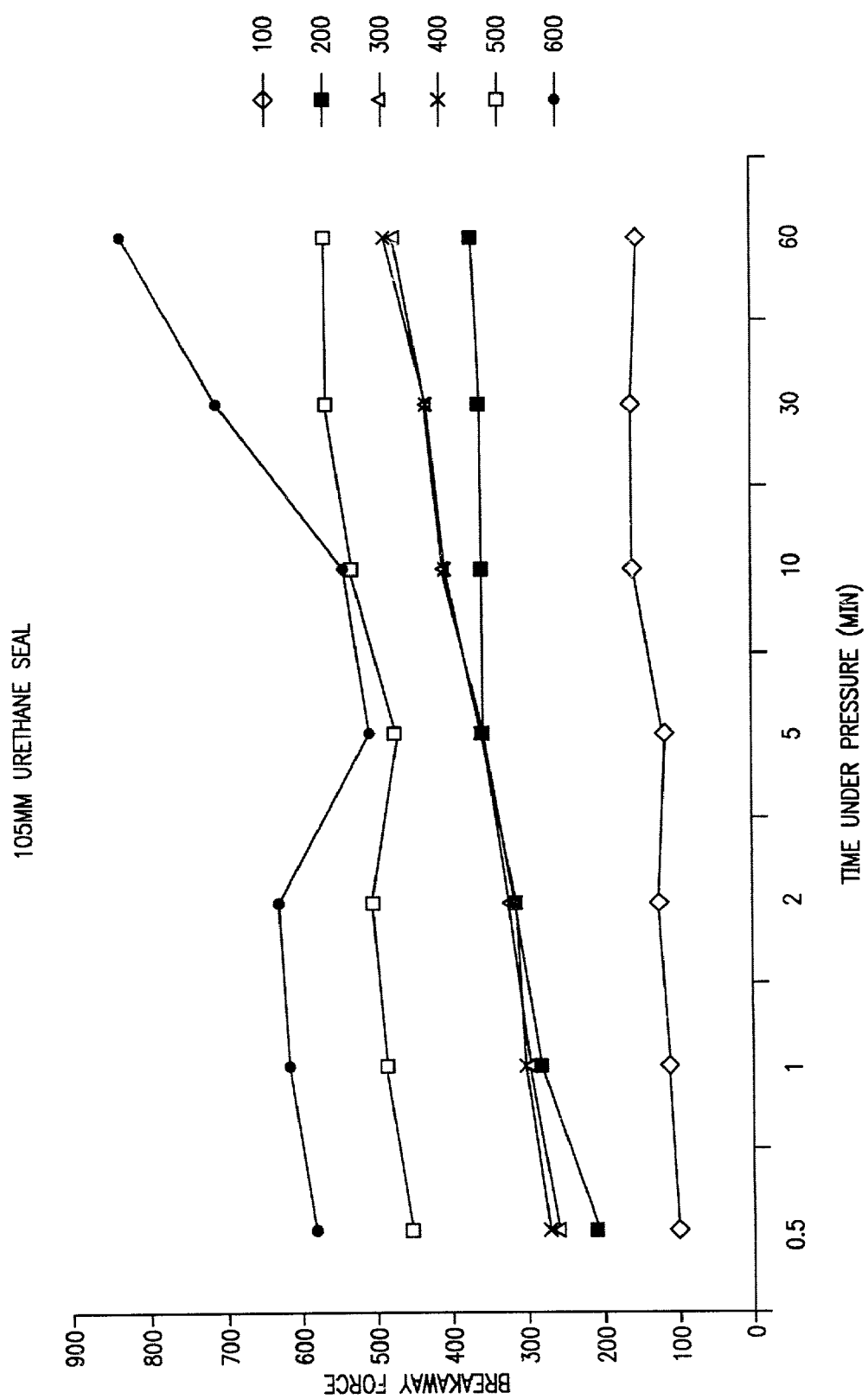
FIG. 12 is a graphical depiction of the breakaway testing on 105 MM seals made from Polyurethane (105 MM PU) without addition of the ARMOSLIP® CP oleamide additive.

FIG. 12 represents the breakaway test on 105 MM seals made from Polyurethane (105 MM PU) without addition of the ARMOSLIP® CP oleamide additive. The time under pressure varied from 30 seconds to 60 minutes at a hydraulic pressure from 100 psi to 600 psi. The seal breakaway force during these tests ran from a minimum of 99 pounds to a maximum of 820 pounds with an average of 459 pounds.

Summarily, the data from the breakaway testing of the present invention show the unexpected and surprising results of lower breakaway force required when the ARMOSLIP® CP oleamide additive is added to the seal material. This lower required breakaway force results in reduced low speed jerkiness or vibration and results in smoother operation of apparatuses such as elevators utilizing the fluid seal devices.

It will be understood that various details of the invention may be changed without departing from the scope of the invention. Furthermore, the foregoing description is for the purpose of illustration only, and not for the purpose of limitation—the invention being defined by the claims.

What is claimed is:

1. In combination, an elevator ram and cylinder with a continuously lubricating low friction fluid seal device therebetween, said combination comprising:
   (a) an elevator ram inside a cylinder defining an annular space between said ram and said cylinder; and
   (b) a U-type fluid seal ring positioned in said annular space between said cylinder and said moving ram, said seal ring having an outer cylindrical surface and comprising: an annular body having an inner side and an outer side; a closed end face and an at least partly open end face; at least one first radial sealing area protruding outwardly from said outer side and in contact with said cylinder and at least one second radial sealing area protruding inwardly from said inner side of said annular body and in contact with said ram; and said fluid seal ring being formed at least in part from an elastomeric compound; wherein an additive is included in said elastomeric compound of said fluid seal ring comprising between about 1.0–5.0% by weight of oleamide in order to reduce the coefficient of friction and low speed vibration of said seal ring against said ram; and further wherein a carbon black filler is included in said elastomeric compound of said fluid seal ring.

2. The combination of claim 1 wherein said elastomeric compound is neoprene rubber.

3. The combination of claim 1 wherein about 2.0% by weight of oleamide is provided as an additive to said elastomeric compound of said fluid seal ring.

4. The combination of claim 1 wherein said oleamide is a slip and antiblocking agent commercially available under the trademark ARMOSLIP® CP.

5. The combination of claim 1 wherein said U-type seal comprises a fabric reinforcement.

6. The combination of claim 5 wherein said fabric reinforcement comprises cotton.

7. The combination of claim 5 wherein said fabric reinforcement comprises polyester.

8. The combination of claim 5 wherein said fabric reinforcement comprises an aramid fiber commercially available under the trademark KEVLAR®.

9. The combination of claim 1 wherein said elastomeric compound is non-fabric reinforced rubber compound.

10. The combination of claim 1 wherein about 50 parts of carbon black filler is added per about 100 parts of elastomeric compound.

11. In combination, an elevator ram and cylinder with a continuously lubricating low friction fluid seal device therebetween, said combination comprising:
   (a) an elevator ram inside a cylinder defining an annular space between said ram and said cylinder; and
   (b) a U-type fluid seal ring positioned in said annular space between said cylinder and said moving ram, said seal ring having an outer cylindrical surface and comprising: an annular body having an inner side and an outer side; a closed end face and an at least partly open end face; at least one first radial sealing area protruding outwardly from said outer side and in contact with said cylinder and at least one second radial sealing area protruding inwardly from said inner side of said annular body and in contact with said ram; and said fluid seal ring being formed at least in part from neoprene rubber; wherein an additive is included in said neoprene rubber of said fluid seal ring comprising about 2.0% by weight of an oleamide slip and antiblocking agent commercially available under the trademark ARMOSLIP® CP in order to reduce the coefficient of friction and low speed vibration of said seal ring against said ram; and further wherein a carbon black filler is included in said neoprene rubber of said fluid seal ring.

12. The combination of claim 11 wherein said U-type seat comprises a fabric reinforcement.

13. The combination of claim 12 wherein said fabric reinforcement comprises cotton.

14. The combination of claim 12 wherein said fabric reinforcement comprises polyester.

15. The combination of claim 12 wherein said fabric reinforcement comprises an aramid fiber commercially available under the trademark KEVLAR®.

16. The combination of claim 11 wherein said U-type seal is formed of non-fabric reinforced neoprene rubber.

17. The combination of claim 11 wherein about 50 parts of carbon black filler is added per about 100 parts of neoprene rubber.

18. In combination, an elevator ram and cylinder with a continuously lubricating low friction fluid seal device therebetween, said combination comprising:
   (a) an elevator ram inside a cylinder defining an annular space between said ram and said cylinder; and
   (b) a U-type fluid seal ring positioned in said annular space between said cylinder and said moving ram, said seal ring having an outer cylindrical surface and comprising: an annular body having an inner side and an outer side; a closed end face and an at least partly open end face; at least one first radial sealing area protruding outwardly from said outer side and in contact with said cylinder and at least one second radial sealing area protruding inwardly from said inner side of said annular body and in contact with said ram; and said fluid seal ring being formed at least in part from neoprene rubber; wherein an additive is included in said neoprene rubber of said fluid seal ring comprising about 2.0% by weight of oleamide in order to reduce the coefficient of friction and low speed vibration of said seal ring against said ram; and further wherein a carbon black filler is included in said neoprene rubber of said fluid seal ring.

19. The combination of claim 18 wherein said oleamide is a slip and antiblocking agent commercially available under the trademark ARMOSLIP® CP.

20. The combination of claim 18 wherein said U-type seal comprises a fabric reinforcement.

21. The combination of claim 20 wherein said fabric reinforcement is selected from the group comprising cotton, polyester and an aramid fiber commercially available under the trademark KEVLAR®.

22. The combination of claim 18 wherein said U-type seal is formed of non-fabric reinforcement neoprene rubber.

23. The combination of claim 18 wherein about 50 parts of carbon black filler is added per about 100 parts of neoprene rubber.

* * * * *